United States Patent
Kumeno et al.

(10) Patent No.: US 12,434,349 B2
(45) Date of Patent: Oct. 7, 2025

(54) SURFACE TREATMENT METHOD

(71) Applicant: SINTOKOGIO, LTD., Nagoya (JP)

(72) Inventors: Fumiaki Kumeno, Nagoya (JP); Hayato Taniguchi, Nagoya (JP)

(73) Assignee: SINTOKOGIO, LTD., Nagoya (JP)

( * ) Notice: Subject to any disclaimer, the term of this patent is extended or adjusted under 35 U.S.C. 154(b) by 1109 days.

(21) Appl. No.: 17/370,368

(22) Filed: Jul. 8, 2021

(65) Prior Publication Data

US 2022/0009054 A1    Jan. 13, 2022

(30) Foreign Application Priority Data

Jul. 13, 2020    (JP) ................. 2020-119888

(51) Int. Cl.
*B24C 1/00* (2006.01)
*B23K 26/352* (2014.01)

(52) U.S. Cl.
CPC ............ *B24C 1/003* (2013.01); *B23K 26/352* (2015.10)

(58) Field of Classification Search
CPC ......... B24C 1/003; B24C 7/007; B24C 11/00; B23K 26/122; B23K 26/144; B23K 26/352
See application file for complete search history.

(56) References Cited

U.S. PATENT DOCUMENTS

| | | | | |
|---|---|---|---|---|
| 6,049,058 A * | 4/2000 | Dulaney | ............ | B23K 26/1224 219/121.84 |
| 6,852,179 B1 * | 2/2005 | Toller | ............ | C21D 10/005 219/121.72 |
| 9,803,258 B2 * | 10/2017 | Murphy | ............ | B23K 26/356 |
| 10,501,834 B2 * | 12/2019 | Groth | ............ | B23K 26/0006 |
| 2006/0111023 A1 | 5/2006 | Kamimura et al. | | |
| 2008/0233838 A1 * | 9/2008 | Mase | ............ | B24C 11/00 451/38 |
| 2017/0087667 A1 * | 3/2017 | Yamamoto | ........... | B23K 26/048 |
| 2019/0184521 A1 * | 6/2019 | Thayer | ............ | B23K 26/354 |
| 2019/0283212 A1 * | 9/2019 | Mase | ............ | H01L 21/6875 |

FOREIGN PATENT DOCUMENTS

| | | |
|---|---|---|
| CN | 1822921 A | 8/2006 |
| JP | 2004-160608 A | 6/2004 |
| JP | 2004-243464 A | 9/2004 |
| JP | 2015-533973 A | 11/2015 |
| WO | WO-2014/065921 A2 | 5/2014 |

OTHER PUBLICATIONS

CN 107262931A, Nakano et al. Oct. 2017.*
JP 2016-3597A, Okawa et al. Jan. 2016.*
Japanese Office Action issued Jun. 27, 2023 in Application No. 2020-119888.

* cited by examiner

*Primary Examiner* — Edward T Tolan

(74) *Attorney, Agent, or Firm* — Faegre Drinker Biddle & Reath LLP

(57) ABSTRACT

A surface treatment method includes a step of irradiating a workpiece with a pulsed laser beam through a transparent liquid and a step of causing particles to collide with a heat-affected layer developed on a surface layer portion of the workpiece in the step of irradiating. The particles each has a core made of an elastic body and abrasive grains provided on a surface of the core.

14 Claims, 11 Drawing Sheets

SURFACE TREATMENT METHOD

TECHNICAL FIELD

The present disclosure relates to a surface treatment method.

BACKGROUND

Japanese Unexamined Patent Publication No. 2015-533973 discloses a method for finishing and removing a laser-heat-affected layer of a component formed by laser peening. In this method, the laser-heat-affected layer is removed by grid blasting, chemical etching, and mechanical finishing. By removing the laser-heat-affected layer in which the tensile stress remains, the fatigue strength of the component can be improved.

SUMMARY

In the method disclosed in Japanese Unexamined Patent Publication No. 2015-533973, the steps for removing the heat-affected layer include multiple processes, which is complicated.

A purpose of the present disclosure is to provide a surface treatment method capable of efficiently removing a heat-affected layer.

A surface treatment method according to an aspect of the present disclosure includes a step of irradiating a workpiece with a pulsed laser beam through a transparent liquid and a step of causing particles to collide with a heat-affected layer developed on a surface layer portion of the workpiece in the step of irradiation. The particles each has a core made of an elastic body and abrasive grains provided on a surface of the core.

In this surface treatment method, particles each having a core made of an elastic body and abrasive grains provided on a surface of the core are caused to collide with a heat-affected layer. As a result, the heat-affected layer can be removed. Since complicated steps including multiple of processes are not required, it is possible to efficiently remove the heat-affected layer.

The step of causing collision may include causing the particles to collide with a microcrack of the heat-affected layer to remove the heat-affected layer using the microcrack as a starting point. In this case, it is possible to efficiently remove the heat-affected layer by using the microcrack as a starting point.

The step of causing collision may include causing the particles to collide with a surface of the workpiece from an oblique direction to grow the microcrack in a direction along the surface of the workpiece. In this case, it is possible to prevent the influence of the collision of the particles from extending to the inside of the heat-affected layer.

The step of causing collision may include repeatedly causing the particles to collide with the microcrack to gradually remove the heat-affected layer while the microcrack is connected to other cracks. In this case, it is possible to more reliably prevent the influence of the collision of the particles from extending to the inside of the heat-affected layer.

The step of irradiation may include generating a pinhole on a surface of the heat-affected layer due to an inclusion contained in the workpiece. The step of causing collision may include causing the particles to collide with the pinhole to remove the heat-affected layer using the pinhole as a starting point. In this case, since the heat-affected layer is removed using the pinhole as a starting point, it is possible to more efficiently remove the heat-affected layer.

The step of causing collision may include causing the particles to collide with a surface of the workpiece from an oblique direction to scrape off a surface layer of the heat-affected layer while the particles are caught inside the pinhole. In this case, it is possible to prevent the influence of the collision of the particles from extending to the inside of the heat-affected layer.

The step of causing collision may include repeatedly causing the particles to collide with the pinhole to gradually remove the heat-affected layer. In this case, it is possible to more reliably prevent the influence of the collision of the particles from extending to the inside of the heat-affected layer.

The step of causing collision may include removing the heat-affected layer by a thickness of 1 μm or more and 10 μm or less. In this case, it is possible to remove the surface layer portion of the workpiece in which residual stress becomes tensile stress or compressive stress close to 0. As a result, it is possible to improve the fatigue strength of the workpiece.

The step of causing collision may include adjusting a surface roughness Ra of the workpiece to a range of 1.5 μm or less. In this case, it is possible to reduce the surface roughness of the workpiece.

The step of causing collision may include adjusting a surface roughness Ra of the workpiece to a range of 1.0 μm or less. In this case, it is possible to further reduce the surface roughness of the workpiece.

DETAILED DESCRIPTION

Hereinafter, an embodiment of the present invention will be described in detail with reference to the accompanying drawings. Note that, the same reference signs are assigned to the same elements or elements having the same function in the description, and the redundant description will be omitted.

Figure 1:
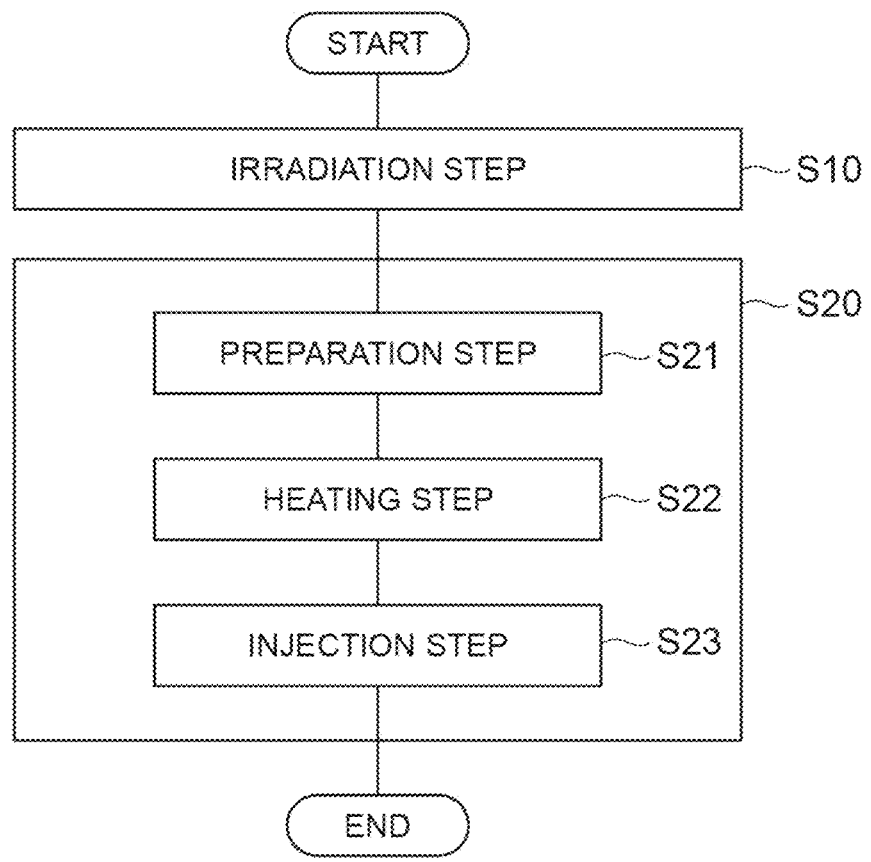
FIG. 1 is a flowchart showing a surface treatment method according to an embodiment.

FIG. 1 is a flowchart showing a surface treatment method according to an embodiment. As shown in FIG. 1, the surface treatment method according to the embodiment includes an irradiation step S10 and a collision step S20. The collision step S20 includes a preparation step S21, a heating step S22, and an injection step S23. In the following, the irradiation step S10 and the collision step S20 will be described.

(Irradiation Step)

Figure 2:
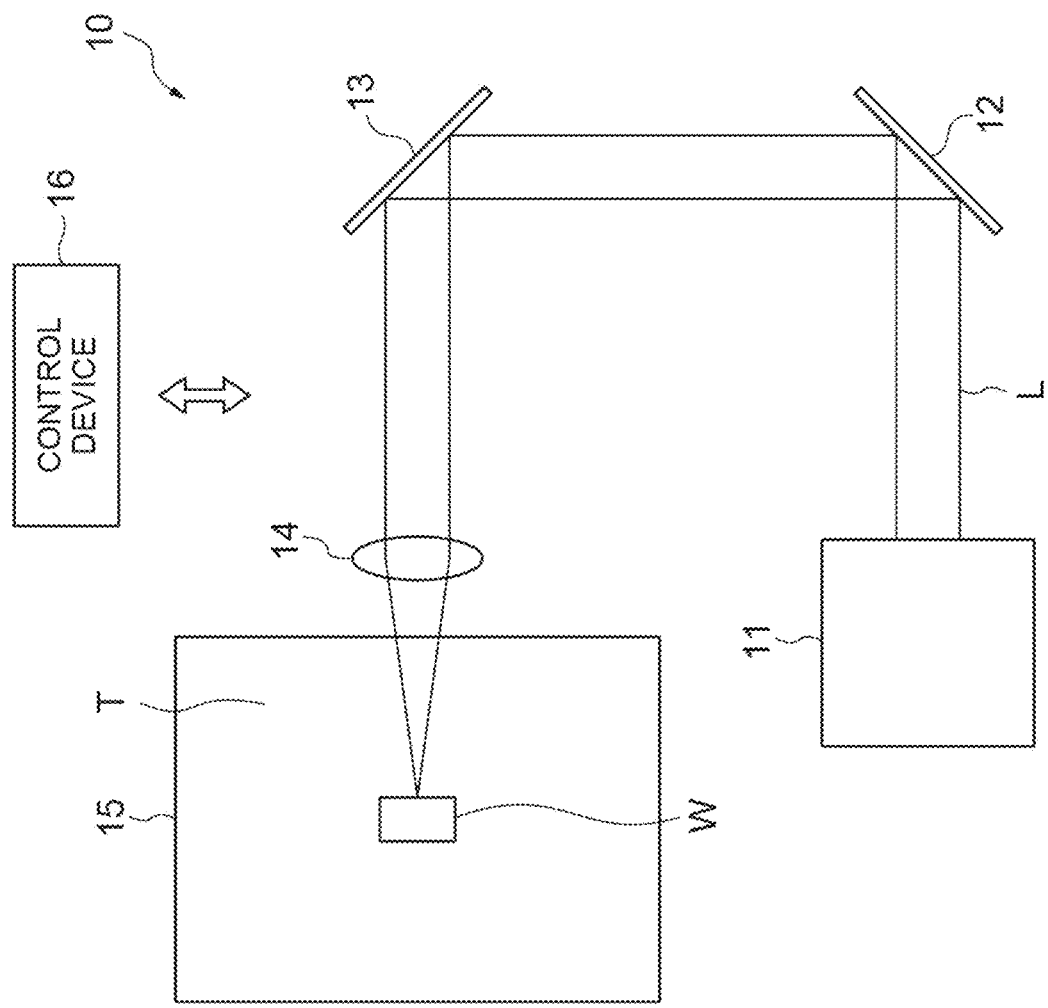
FIG. 2 is a configuration diagram showing a laser irradiation device.

The irradiation step S10 is performed using a laser irradiation device 10. FIG. 2 is a configuration diagram showing a laser irradiation device. As shown in FIG. 2, the laser irradiation device 10 includes a laser oscillator 11, reflection mirrors 12 and 13, a condenser lens 14, a processing stage 15, and a control device 16. The laser oscillator 11 is a device that oscillates a pulsed laser beam L. The reflection mirrors 12 and 13 transmit the pulsed laser beam L oscillated by the laser oscillator 11 to the condenser lens 14. The condenser lens 14 condenses the pulsed laser beam L at a processing position of a workpiece W. The processing stage 15 is a water tank filled with a medium made of a transparent liquid T such as water. The workpiece W is placed in the processing stage 15 while being immersed in the transparent liquid T. The workpiece W is made of, for example, a steel material or a non-ferrous metal material such as an aluminum alloy or the like. The workpiece W is, for example, a vacuum carburized material.

The laser irradiation device 10 is controlled by the control device 16. The control device 16 is configured as, for example, a programmable logic controller (PLC). The control device 16 may be configured as a computer system including a processor such as a central processing unit (CPU), memories such as a random access memory (RAM) and a read only memory (ROM), input/output devices such as a touch panel, a mouse, a keyboard, and a display, and a communication device such as a network card. The control device 16 implements the function of the control device 16 by operating each hardware under the control of the processor based on computer programs stored in the memories.

The irradiation step S10 is a step of irradiating the workpiece W with the pulsed laser beam L through the transparent liquid T. The pulsed laser beam L is oscillated by the laser oscillator 11 and then transmitted to the condenser lens 14 by an optical system including the reflection mirrors 12 and 13. Then, the pulsed laser beam L is condensed by the condenser lens 14 and applied to the surface of the workpiece W through the transparent liquid T. The irradiation with the pulsed laser beam L is performed in response to the operation of the processing stage 15. The irradiation condition (for example, the spot diameter, pulse energy, or irradiation density) is appropriately set.

When the pulsed laser beam L is applied to the surface of the workpiece W, laser ablation occurs on the surface of the workpiece W, and plasma is generated. In the atmosphere, the material at the irradiation point vaporizes. Since the irradiation point on the workpiece W is covered with the transparent liquid T, the workpiece W is plastically deformed by the shock wave of the plasma. With the surface treatment utilizing such laser ablation (what is called laser peening), residual compressive stress is applied to the surface layer portion of the workpiece W, which can improve the fatigue strength of the workpiece W.

A surface treatment method utilizing thermal energy and a shock wave such as laser peening can apply residual compressive stress from the surface of the workpiece W to a deeper position compared with shot peening. With this surface treatment method, residual compressive stress can be introduced to, for example, a depth of 1 mm or more from the surface of the workpiece W. However, in the outermost layer of the workpiece W, the residual stress becomes tensile stress or, compressive stress close to 0 due to the influence of heat.

In the laser-peened area of the surface layer portion of the workpiece W, a heat-affected layer Wa (see FIG. 4), which is affected by heat, is developed. In the heat-affected layer Wa, a microcrack C1 (see FIG. 4) is generated. The size of the microcrack C1 is, for example, 10 µm or more and 50 µm or less. If the material constituting the workpiece W contains an inclusion such as Cr or the like, a pinhole P (see FIG. 7) is also generated on the surface of the heat-affected layer Wa due to the influence of the heat of ablation. The size of the pinhole P is, for example, 10 µm or more and 50 µm or less. These microcrack C1 and pinhole P cause generation of cracks and reduce the fatigue strength.

(Collision Step)

Figure 3:
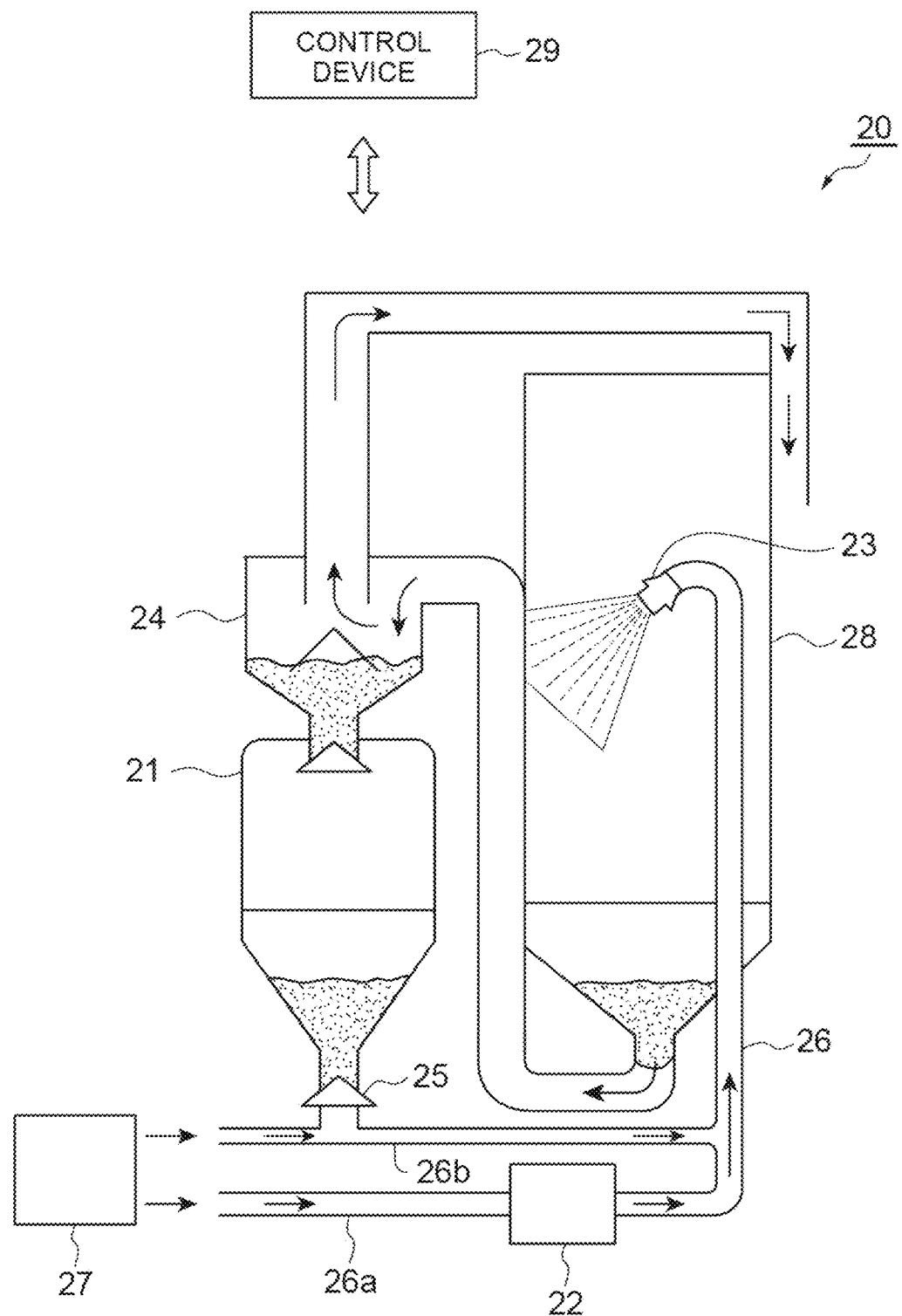
FIG. 3 is a block diagram showing a blasting device.

The collision step S20 is performed by, for example, a blasting device. FIG. 3 is a block diagram showing a blasting device. A blasting device 20 shown in FIG. 3 is a direct pressure type (pressurized type) blasting device. Although the direct pressure type will be described in this specification, the blasting device 20 may be a suction type (gravity type). The blasting device 20 includes a storage container 21, a heater 22, and a nozzle 23. The storage container 21 defines a space for storing particles 30 for blasting (see FIG. 4) inside and stores the particles 30.

Figure 4:
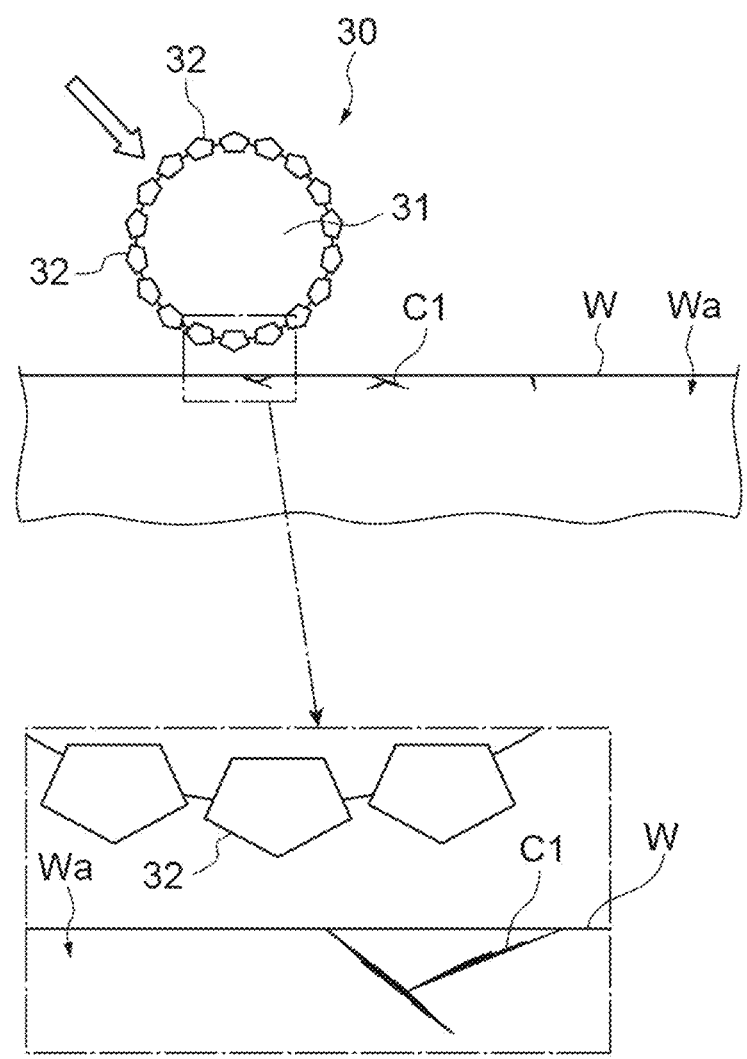
FIG. 4 is a schematic diagram and a partially enlarged view showing a mechanism for removing a heat-affected layer using a microcrack as a starting point.

The particles 30 each has a core 31 made of an elastic body and a plurality of abrasive grains 32 provided on the surface of the core 31 (see FIG. 4). The core 31 is made of hot melt resin. The hot melt resin is resin having thermoplasticity. The hot melt resin is solid (a solid phase) at room temperature and melts at a temperature equal to or higher than the melting point to be changed to liquid (a liquid phase). By changing the hot melt resin to a solid phase while the hot melt resin in a liquid phase is being in contact with another material, the hot melt resin is bonded to the material.

The hot melt resin that can be used for the core 31 is, for example, a material having a melting point of 60° C. or higher and 100° C. or lower. If the melting point is lower than 60° C., the hot melt resin may be changed to a liquid phase during blasting. If the melting point exceeds 100° C., the step of fixing the abrasive grains 32 to the core 31 may be costly. In addition, the softening point also tends to be high in temperature, and it can be difficult to control the rubber elasticity. The softening point is the temperature at which the hot melt resin begins to soften. Alternatively, the hot melt resin that can be used for the core 31 is a material whose rubber elasticity changes depending on the temperature in a temperature range of 80° C. or lower. For example, a material in which the change in rubber hardness is 1.3 (A) or more with respect to a temperature change of 1° C. in a temperature range of 20° C. or higher and 50° C. or lower can be used. Here, the rubber hardness is the shore hardness (A) and is measured by, for example, a type A durometer.

The hot melt resin satisfying the above conditions contains, as an example, ethylene vinyl acetate, polyurethane, low density polyethylene, polyester, polyamide, polyolefin, ionomer, or polyvinyl alcohol as a main component. A hot melt resin containing ethylene vinyl acetate as a main component has a melting point in a range of 60° C. or higher and 97° C. or lower, and a softening point of 69° C. or lower (when the melting point is 60° C., the softening point is 40°

C. or lower). A hot melt resin containing polyurethane as a main component has a melting point of 90° C.

The core 31 is a particle obtained by powdering the hot melt resin into a particle size in a predetermined range. The shape of the core 31 may be spherical, tabular, columnar, conical, or polyhedral. The particle size of the core 31 may be in a range of 50 μm or more and 1000 μm or less or a range of 600 μm or more and 1000 μm or less. The core 31 is only required to contain the hot melt resin as a main component and may contain a resin other than the hot melt resin or other components.

The abrasive grains 32 are particles obtained by powdering a material harder than the material to be blasted into a particle size in a predetermined range. As the material of the abrasive grains 32, alumina, silicon carbide, cerium oxide, tungsten carbide, zirconia, boron carbide, diamond, or the like may be used. The abrasive grains 32 may be powder having a predetermined average particle size. The average particle size is the median diameter (D50) and indicates the distribution of the particle size. The average particle size of the abrasive grains 32 may be 20 μm or less or 10 μm or less.

The abrasive grains 32 are fixed to the core 31. To be fixed means that an object to be fixed and a melted substance are in close contact and adhere with each other by solidifying the melted substance. The abrasive grains 32 and the core 31 melted by heat are in close contact with each other, and the abrasive grains 32 adhere to the core 31 by solidifying the core 31 by cooling. The abrasive grains 32 may be fixed on the surface of the core 31 or on the inside of the core 31 in the radial direction. The abrasive grains 32 may be fixed in such a manner as to be partially buried on the inside of the core 31 in the radial direction from the surface of the core 31 and partially exposed to the outside of the core 31 in the radial direction from the surface of the core 31. The abrasive grains 32 may be fixed to the core 31 in such a manner as to be completely buried. In this case, the abrasive grains 32 fixed to the core 31 in such a manner as to be completely buried are distributed more in the vicinity of the surface of the core 31 than in the center of the core 31.

When the abrasive grains 32 fixed to the core 31 in such a manner as to be completely buried are distributed more in the vicinity of the surface of the core 31 than in the center of the core 31, the abrasive grains 32 fixed in such a manner as to be completely buried are newly exposed from the inside if the surface of the particle 30 abrades. The particle 30 in which the abrasive grains 32 are distributed more in the vicinity of the surface of the core 31 has a higher cutting force and a larger elastic limit than an abrasive particle in which the abrasive grains 32 are uniformly distributed inside the core 31.

Since the core 31 is made of the hot melt resin, the hardness of the particle 30 (the core 31) changes depending on the temperature. When the blasting is performed using the particles 30, the hardness of the particles 30 changes depending on the temperature of gas to be injected together with the particles 30. By using the particles 30 and adjusting the temperature of the gas, it is possible to efficiently perform blasting for obtaining the target surface state of the workpiece W.

The storage container 21 is supplied with the particles 30 from the outside. For example, an operator may supply the storage container 21 with the particles 30. The storage container 21 may reuse a part of the particles 30 used for blasting. In this case, the storage container 21 is supplied with the particles 30 used for blasting from a classification mechanism 24 described later. The storage container 21 is connected to the nozzle 23 via a fixed-quantity supply unit 25 and an auxiliary conduit 26b. The fixed-quantity supply unit 25 is a device that sends out the particles 30 stored in the storage container 21 to the auxiliary conduit 26b and is, for example, a screw feeder.

Each of a conduit 26a and the auxiliary conduit 26b is connected to a gas supply source 27 that supplies gas and a pipe 26. The gas supply source 27 is, for example, a compressor or a gas cylinder that supplies gas of a medium pressure (for example, 0.1 MPa or more and 0.6 MPa or less), or a fan or a blower that supplies gas of a low pressure (for example, 0.01 MPa or more and 0.1 MPa or less). In the present embodiment, a compressor supplies compressed air. The gas supplied from the gas supply source 27 to the auxiliary conduit 26b conveys the particles 30 sent out by the fixed-quantity supply unit 25 to the nozzle 23. The injection pressure of the blasting device 20 is mainly determined by the pressure of the gas supplied from the conduit 26a to the nozzle 23.

The heater 22 is a device that heats the gas in the conduit 26a. The heater 22 is, for example, a nichrome wire, a ceramic heater, a ribbon heater, an oil heater, a heat exchanger, or the like. The heater 22 may be provided on the outer wall of the conduit 26a or may be provided inside the conduit 26a.

The nozzle 23 injects the particles 30 supplied from the storage container 21 together with the gas heated by the heater 22. The nozzle 23 is housed in a treatment chamber 28 and is supplied via the pipe 26 with a gas-solid two-phase flow in which the particles 30 supplied from the storage container 21 and the gas heated by the heater 22 are mixed. The nozzle 23 injects the particles 30 together with the gas toward the workpiece W (see FIG. 4) placed in the treatment chamber 28. As a result, the workpiece W is blasted. The workpiece W may be supported by a table (not shown) and its position may be adjusted by a table drive mechanism.

The lower part of the treatment chamber 28 is connected to the storage container 21 via the classification mechanism 24. The particles 30 and chips of the workpiece W that have fallen to the lower part of the treatment chamber 28 are sucked by a dust collector (not shown) and pass through the classification mechanism 24. The classification mechanism 24 classifies reusable particles 30 and other fine particles (such as broken particles 30 and the chips of the workpiece W). The other fine particles are collected by the dust collector. The lower part of the classification mechanism 24 is connected to the upper part of the storage container 21. The reusable particles 30 are supplied from the classification mechanism 24 to the storage container 21. If the particles 30 are not reused, the blasting device 20 may not include the classification mechanism 24.

The blasting device 20 is controlled by a control device 29. The control device 29 is configured as, for example, a PLC. The control device 29 may be configured as a computer system including a processor such as a CPU, memories such as RAM and a ROM, input/output devices such as a touch panel, a mouse, a keyboard, and a display, and a communication device such as a network card. The control device 29 implements the function of the control device 29 by operating each hardware under the control of the processor based on computer programs stored in the memories.

The collision step S20 is a step of causing the particles 30 to collide with the heat-affected layer Wa developed on the surface layer portion of the workpiece W in the irradiation step S10. Firstly in the collision step S20, the particles 30 are prepared as the preparation step S21. The preparation means storing a predetermined amount of particles 30 in the storage container 21.

Then, as the heating step S22, the gas is heated. The temperature of the gas rises due to heating by the heater 22. The gas heated by the heater 22 becomes an air flow flowing to the nozzle 23, passing through the conduit 26a, the auxiliary conduit 26b, and the pipe 26. The particles 30 are supplied from the fixed-quantity supply unit 25 to the air flow of the heated gas flowing to the nozzle 23. The hardness of the particles 30 changes depending on the temperature of the gas.

Finally, as the injection step S23, the prepared particles 30 and the heated gas are injected together. The nozzle 23 injects the particles 30 and the heated gas together. The nozzle 23 injects the particles 30 in an oblique direction with respect to the surface of the workpiece W. The injected particles 30 collide with the heat-affected layer Wa of the workpiece W. The particles 30 collide with the workpiece W at a predetermined speed and a predetermined incident angle. The speed of the particles 30 is determined based on the pressure of the gas, the shape of the nozzle 23, and the distance between the nozzle 23 and the workpiece W. The incident angle of the particles 30 is determined based on the inclination angle of the nozzle 23 with respect to the workpiece W, and the shape of the nozzle 23. These speed and incident angle can be changed as blasting conditions. The heat-affected layer Wa is removed by the collision of the particles 30. When the injection step S23 is completed, the collision step S20 is terminated.

In the collision step S20, the particles 30 with an arbitrary hardness are injected, and the heat-affected layer Wa is removed (thinned) by a thickness of 1 μm or more and 10 μm or less. The removed amount (thickness) of the heat-affected layer Wa is adjustable by the hardness of the injected particles 30. By removing the heat-affected layer Wa, the microcrack C1 of the heat-affected layer Wa is also removed. The surface roughness of the workpiece W is reduced in the collision step S20. The surface roughness Ra of the workpiece W is adjusted to a range of 1.5 μm or less, preferably 1.0 μm or less. The lower limit of the surface roughness Ra may be 0.2 μm or 0.1 μm. Note that, the surface roughness Ra indicates the arithmetic average roughness specified in JIS B0601; 2001.

The control device 29 adjusts the hardness of the core 31 by adjusting the heating temperature of the heater 22. As an example, the control device 29 sets the temperature of the particles 30 at three temperature ranges of a low temperature range, a medium temperature range, and a high temperature range to adjust the hardness of the core 31. The low temperature range, the medium temperature range, and the high temperature range are set in such a manner as to become higher in order. When the temperature of the particles 30 is set at the high temperature range, the particles 30 are softer than those when the temperature of the particles 30 is set at the medium temperature range or the low temperature range. Thus, the deformation amount at the collision with the workpiece W is large, and the workpiece W is weakly polished.

Figure 5:
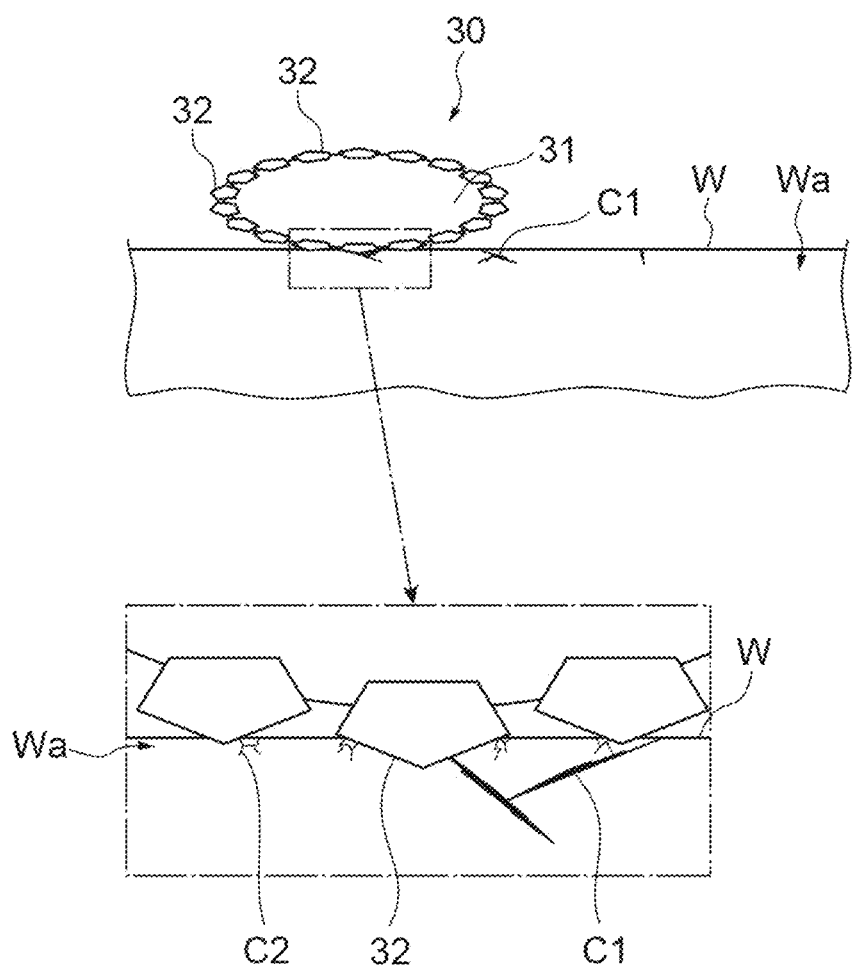
FIG. 5 is a schematic diagram and a partially enlarged view showing the mechanism for removing the heat-affected layer using the microcrack as the starting point.
Figure 6:
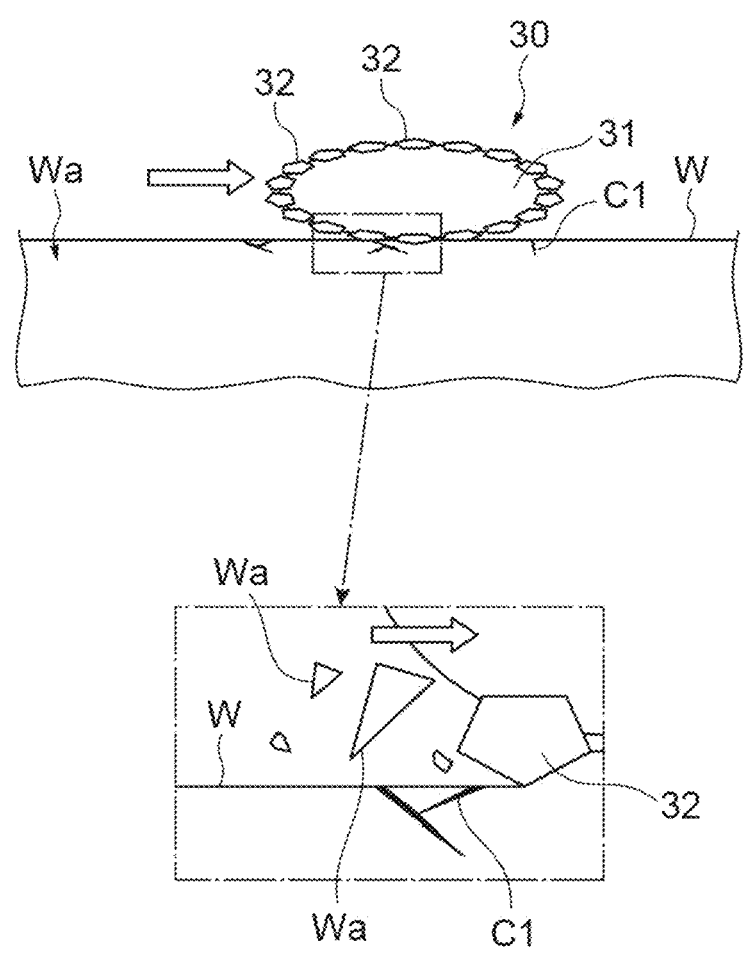
FIG. 6 is a schematic diagram and a partially enlarged view showing the mechanism for removing the heat-affected layer using the microcrack as the starting point.

FIGS. 4 to 6 are schematic diagrams and partially enlarged views showing a mechanism for removing a heat-affected layer using a microcrack as a starting point.

As shown in FIG. 4, a particle 30 injected in the injection step S23 is injected in an oblique direction with respect to the surface of the workpiece W. Thus, the particle 30 collides from an oblique direction with the microcrack C1 generated in the heat-affected layer Wa of the workpiece W in the irradiation step S10. As shown in FIG. 5, when the particle 30 collides (comes into contact) with the surface of the workpiece W, the spherical core 31 is deformed by the impact of the collision, and the abrasive grains 32 generate cracks C2 finer than the microcrack C1 in the vicinity of the microcrack C1.

Since the particle 30 collides from an oblique direction, the collision energy is low. Since the surface layer portion (defect layer) of the workpiece W is fragile due to the presence of the microcrack C1, the new cracks C2 are easily generated with low collision energy. As a result, the microcrack C1 grows substantially in the plane direction (the direction along the surface of the workpiece W). Since there is no microcrack C1 at a position deeper than the surface layer portion of the workpiece W, the new cracks C2 are hardly generated although the particle 30 collides.

The particle 30 is injected from an oblique direction and thus moves in the plane direction (the direction along the surface of the workpiece W) after colliding with the surface of the workpiece W although the moving is a minute time by sliding on the surface of the workpiece W as shown in FIG. 6. Due to the sliding of the particle 30, the microcrack C1 and the nearby cracks C2 are stressed, and the cracks grow. By injecting a plurality of particles 30 to cause the particles 30 to repeatedly collide with the microcrack C1, the microcrack C1 grows and is connected to the cracks C2. As a result, the surface layer of the heat-affected layer Wa is fractured. By scraping off the fractured surface layer by the particles 30, the surface of the workpiece W is polished. In this manner, the heat-affected layer Wa is gradually removed using the microcrack C1 as a starting point in the collision step S20. The surface of the workpiece W is polished by cutting with the particles 30.

Figure 7:
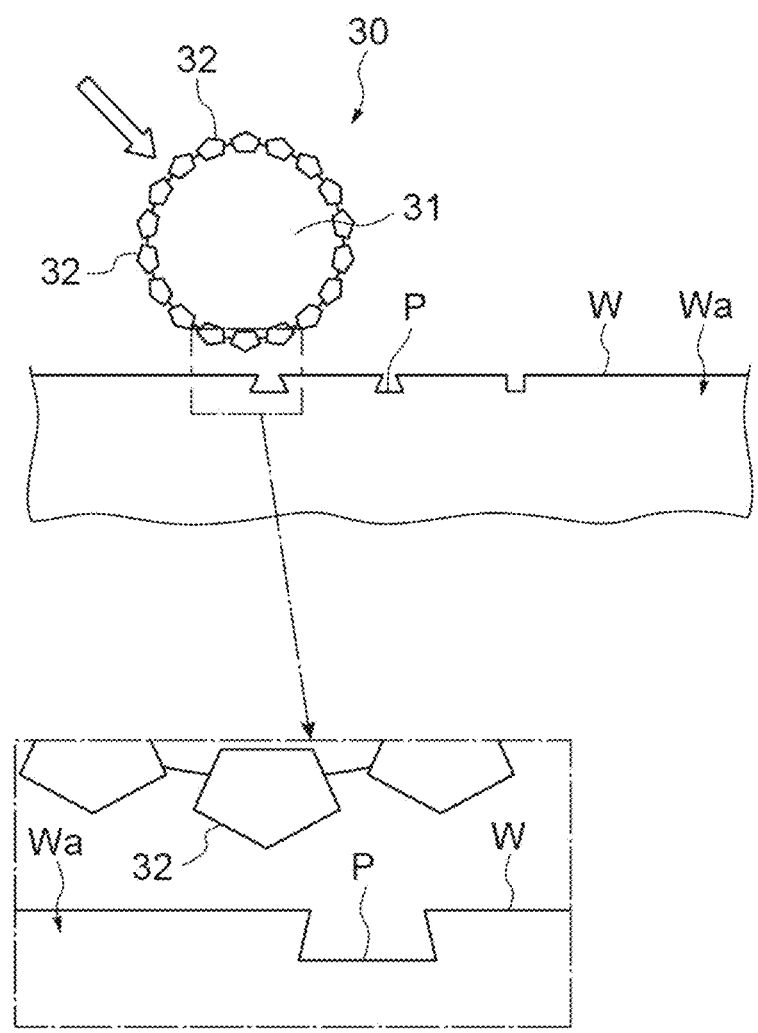
FIG. 7 is a schematic diagram and a partially enlarged view showing a mechanism for removing a heat-affected layer using a pinhole as a starting point.
Figure 8:
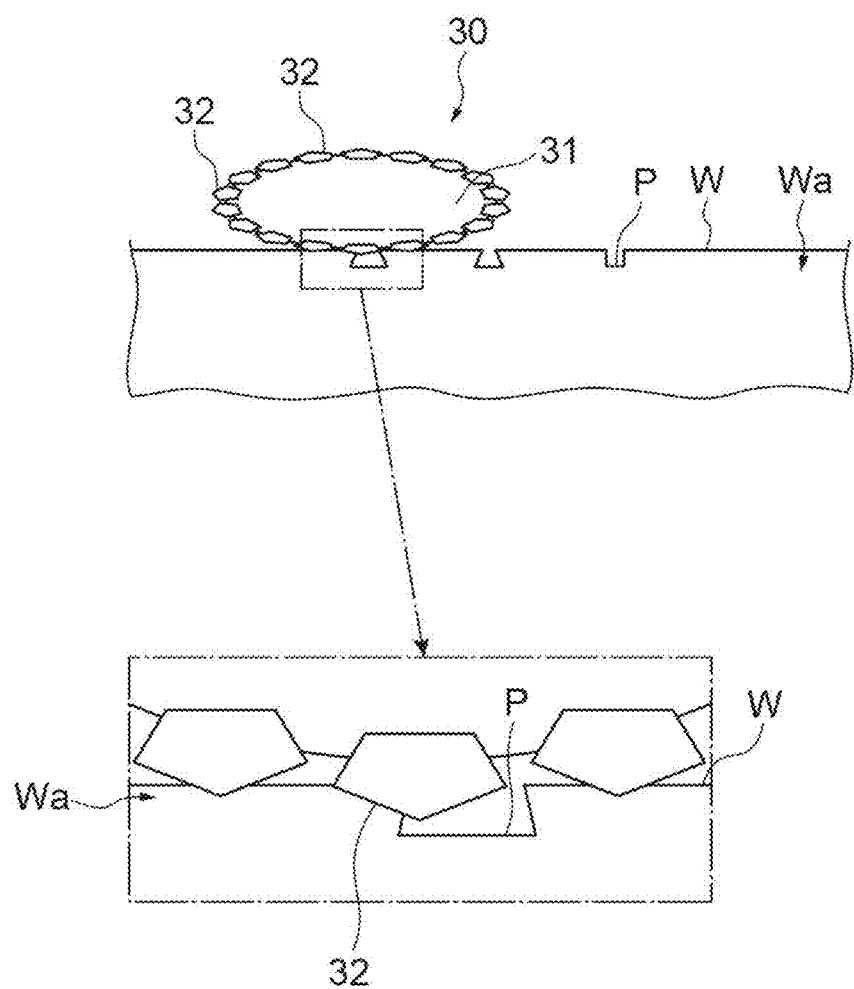
FIG. 8 is a schematic diagram and a partially enlarged view showing the mechanism for removing the heat-affected layer using the pinhole as the starting point.
Figure 9:
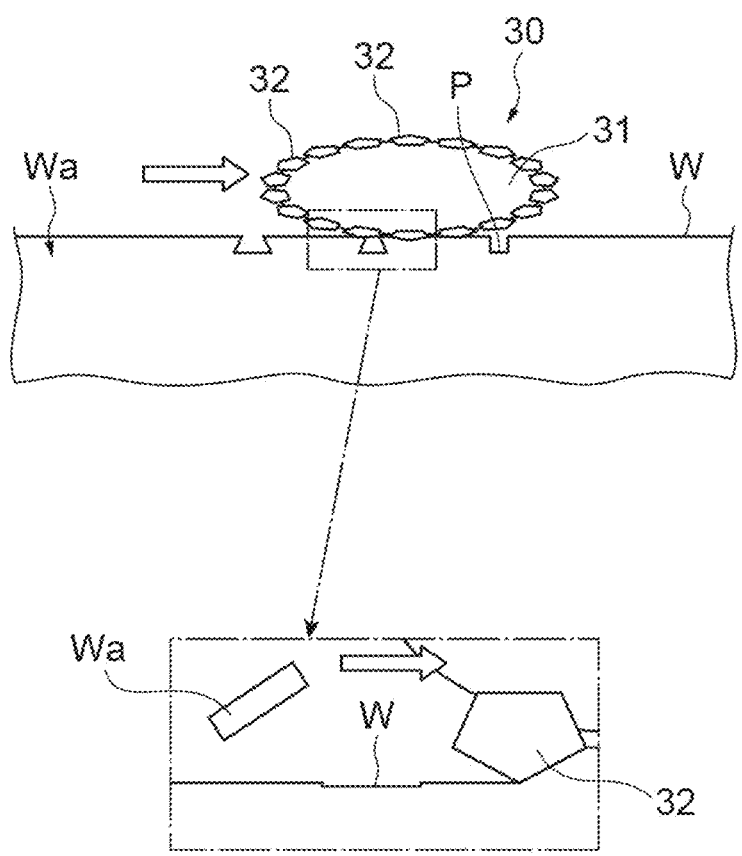
FIG. 9 is a schematic diagram and a partially enlarged view showing the mechanism for removing the heat-affected layer using the pinhole as the starting point.

FIGS. 7 to 9 are schematic diagrams and partially enlarged views showing a mechanism for removing a heat-affected layer using a pinhole as a starting point;

As shown in FIG. 7, a particle 30 injected in the injection step S23 is injected in an oblique direction with respect to the surface of the workpiece W. Thus, the particle 30 enters, from an oblique direction, a pinhole P generated on the surface of the workpiece W in the irradiation step S10. As shown in FIG. 8, when the particle 30 collides (comes into contact) with the surface of the workpiece W, the spherical core 31 is deformed by the impact of the collision, and the edge portions of the abrasive grains 32 go into the pinhole P.

The particle 30 is injected from an oblique direction and thus moves in the plane direction after colliding with the surface of the workpiece W although the moving is a minute time by sliding on the surface of the workpiece W as shown in FIG. 9. At this time, the abrasive grains 32 are caught inside the pinhole P and scrapes off the surface layer of the heat-affected layer Wa using the pinhole P as a starting point. In the collision step S20, by injecting a plurality of particles 30 to cause the particles 30 to repeatedly collide with the pinhole P, the heat-affected layer Wa is gradually removed using the pinhole P as a starting point. The surface of the workpiece W is polished by cutting with the particles 30.

As described above, in the surface treatment method according to the embodiment, the particles 30 each having the core 31 made of an elastic body and the abrasive grains 32 provided on the surface of the core 31 are caused to collide with the heat-affected layer Wa in the collision step S20. As a result, the heat-affected layer Wa is removed. Accordingly, unlike the method disclosed in Japanese Unexamined Patent Publication No. 2015-533973, it is not necessary to perform complicated steps including multiple processes. In particular, chemical etching is not required, it is possible to reduce adverse effects on the environment due to the use of chemicals and the cost of neutralization. Thus, with the surface treatment method according to the embodiment, it is possible to efficiently remove the heat-affected layer Wa, which becomes tensile stress or compressive stress close to 0. By removing the heat-affected layer Wa, the microcrack C1 and the pinhole P are also removed, which prevents the growth of cracks and improves the fatigue strength. Accordingly, it is possible for the surface of the workpiece W to be made an abrasion-resistible durable surface.

In the collision step S20, by causing the particles 30 to collide with the microcrack C1 of the heat-affected layer Wa, the heat-affected layer Wa is removed using the microcrack C1 as a starting point. In this manner, the microcrack C1 is used as the starting point, and it is possible to efficiently remove the heat-affected layer Wa. In the collision step S20, by causing the particles 30 to collide with the surface of the workpiece W from an oblique direction, the microcrack C1 is caused to grow in the direction along the surface of the workpiece W. Thus, it is possible to prevent the influence of the collision of the particles 30 from extending to the inside of the heat-affected layer Wa. In the collision step S20, by repeatedly causing the particles 30 to collide with the microcrack C1, the heat-affected layer Wa is gradually removed while the microcrack C1 is connected to nearby cracks C2. Thus, it is possible to more reliably prevent the influence of the collision of the particles 30 from extending to the inside of the heat-affected layer Wa.

In the irradiation step S10, a pinhole P is generated on the surface of the heat-affected layer Wa due to an inclusion contained in the workpiece W. In the collision step S20, by causing the particles 30 to collide with the pinhole P, the heat-affected layer Wa is removed using the pinhole P as a starting point. In this manner, the heat-affected layer Wa is removed using the pinhole P as a starting point, and it is possible to more efficiently remove the heat-affected layer Wa. In the collision step S20, by causing the particles 30 to collide with the surface of the workpiece W from an oblique direction, the surface layer of the heat-affected layer Wa is scraped off while the particles 30 are caught inside the pinhole P. Thus, it is possible to prevent the influence of the collision of the particles 30 from extending to the inside of the heat-affected layer Wa. In the collision step S20, by repeatedly causing the particles 30 to collide with the pinhole P, the heat-affected layer Wa is gradually removed. Thus, it is possible to more reliably prevent the influence of the collision of the particles 30 from extending to the inside of the heat-affected layer Wa.

In the collision step S20, the heat-affected layer Wa is removed by a thickness of 1 μm or more and 10 μm or less. Thus, it is possible to remove the surface layer portion of the workpiece W in which the residual stress introduced in the irradiation step S10 becomes tensile stress or compressive stress close to 0. As a result, it is possible to improve the fatigue strength of the workpiece W. As described later, the value of the residual compressive stress introduced in the workpiece W in the collision step S20 becomes the maximum in a range of 10 μm or more and 50 μm or less in depth from the surface of the workpiece W. With general polishing, the polishing may be performed beyond this range. In the collision step S20, the particles 30 whose polishing strength are easily adjustable by adjusting the temperature are used to expose the portion where the value of the residual compressive stress in the workpiece W is the maximum, and it is possible to improve the fatigue strength of the workpiece W.

In the collision step S20, the surface roughness Ra of the workpiece W is adjusted to a range of 1.5 μm or less, preferably 1.0 μm or less. Thus, it is possible to reduce the surface roughness of the workpiece W and to improve the surface accuracy deteriorated in the irradiation step S10. Accordingly, it is possible to prevent the growth of cracks due to the surface roughness.

The prevention of the growth of cracks is more effective as the surface roughness Ra is as low as possible, but the time required for the collision step S20 becomes longer. That is, by reducing the surface roughness Ra as much as possible a member can be processed to have a surface in which generation of cracks is prevented, but the productivity is lowered. In order to prevent the growth of cracks and to satisfy the productivity, the lower limit of the surface roughness Ra is adjusted to 0.2 μm, preferably 0.1 μm.

The present invention is not necessarily limited to the above embodiment, and can be variously changed without departing from the gist. For example, in the collision step S20 in the above embodiment, blasting is performed using the blasting device 20, but the blasting is not limited thereto. In the collision step S20, it is only required to cause the particles 30 to collide with the heat-affected layer Wa of the workpiece W, and burnishing, barreling, or shot peening may be performed using the particles 30, for example.

Experimental examples are described below.

Figure 10:
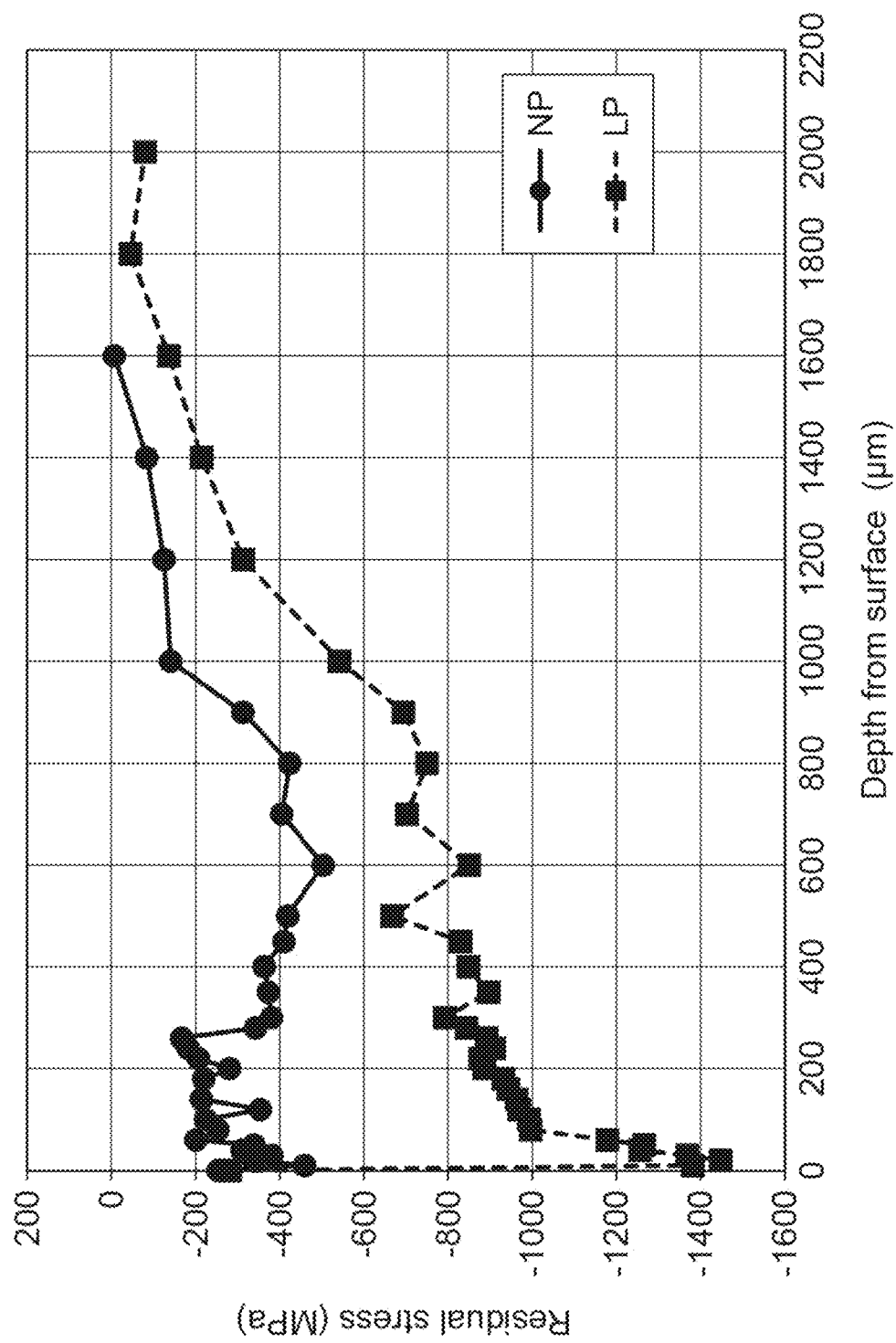
FIG. 10 is a graph showing measurement results of residual stress.
Figure 11:
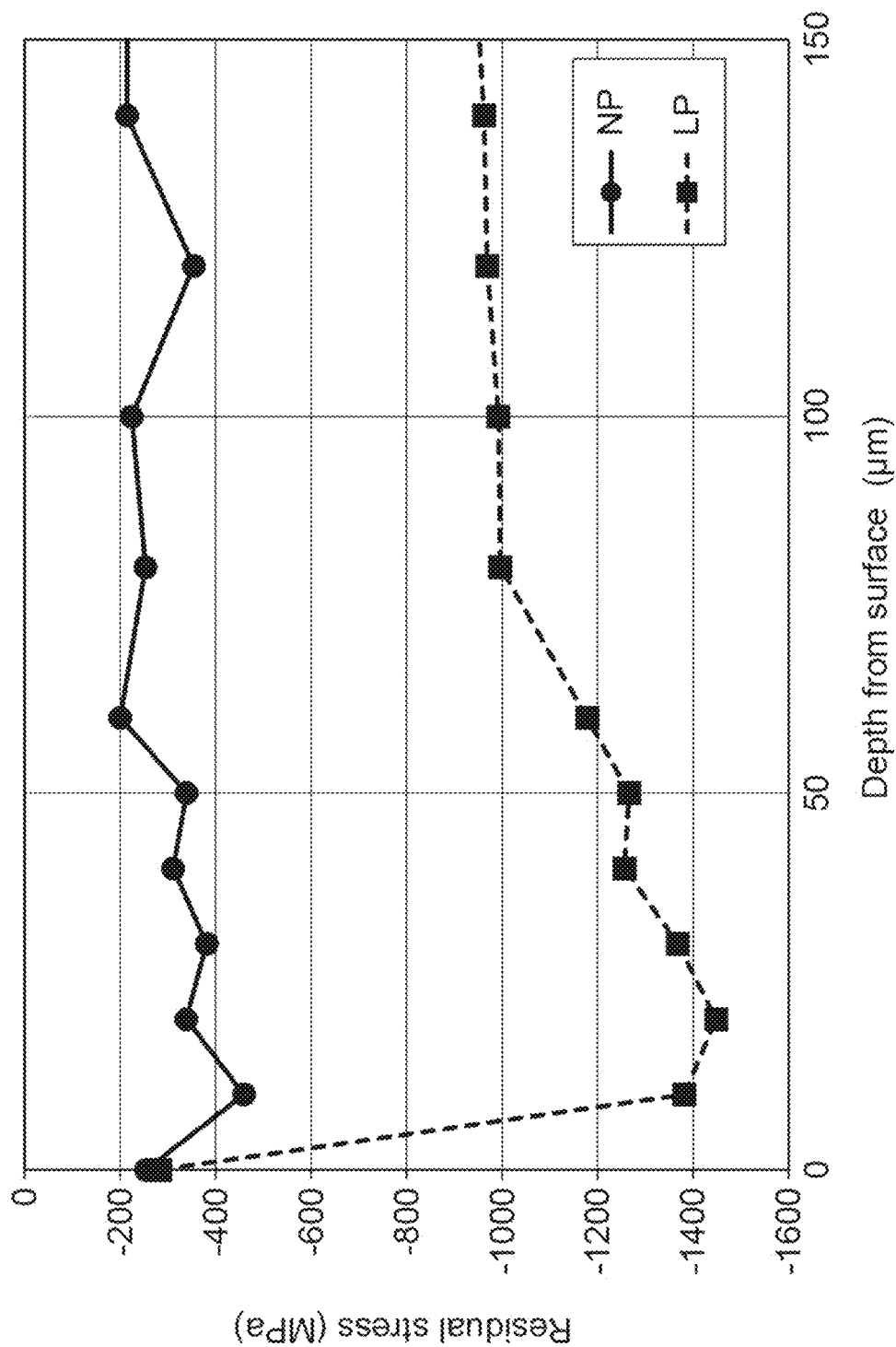
FIG. 11 is a graph showing measurement results of the residual stress.

FIGS. 10 and 11 are graphs showing measurement results of residual stress. In each of FIGS. 10 and 11, the horizontal axis represents the depth (μm) from the surface of a workpiece, and the vertical axis represents the residual stress (MPa). Negative values indicate compressive stress and positive values indicate tensile stress. The term "NP" indicates the measurement results of the residual stress of a workpiece not subjected to the irradiation step (laser peening), and the term "LP" indicates the measurement results of the residual stress of a workpiece subjected to the irradiation step (laser peening). FIG. 10 shows the measurement results to a depth of 2000 μm, and FIG. 11 shows the measurement results to a depth of 150 μm. Laser peening was performed with a spot diameter of 1.2 mm, a pulse energy of 987 mJ, and an irradiation density of 44 Pulses/mm$^2$.

As shown in FIGS. 10 and 11, with laser peening, residual compressive stress can be applied to a depth of 2000 μm from the surface of the workpiece. In particular, the value of residual compressive stress is large in a range of 10 μm or more and 50 μm or less in depth. The compressive stress is close to 0 in the outermost layer of the workpiece. Thus, by removing the heat-affected layer by a thickness of 1 μm or more and 10 μm or less, the residual compressive stress is sufficiently applied, and the portion where cracks are hard to grow can be used as the outermost layer of the workpiece.

The collision step was performed after the irradiation step, and the surface stress and surface roughness of a workpiece were measured before and after the collision step. The results of the measurement are described below. The collision step was performed using a direct pressure type (pressurized type) blasting device. The particles for blasting were made of cores using hot melt powder PR8050 of ethylene vinyl acetate copolymer manufactured by Tokyo Printing Ink Mfg. Co., Ltd. and abrasive grains using silicon carbide (SiC) powder GC #2000 manufactured by Matsumi Kenmazai Co., Ltd. The collision step was performed under the condition that the removal amount (thickness) of the workpiece was 7 μm.

The residual stress of the surface of the workpiece was measured by the cos α method using a residual stress measuring device p-X360 manufactured by Pulstec Industrial Co., Ltd. The measurement was performed using a Cr tube with the irradiation diameter of φ1.0 mm, and the collimator diameter of φ1.0 mm. The residual stress before the collision step was −151 MPa along the laser irradiation direction and −195 MPa in the direction orthogonal to the laser irradiation direction. The residual stress after the collision step was −918 MPa along the laser irradiation direction and −1005 MPa in the direction orthogonal to the laser irradiation direction. As the result of removing the heat-affected layer in the collision step, it was confirmed that the value of the residual compressive stress on the surface was increased.

The surface roughness was measured using Surfcom 1400 manufactured by TOKYO SEIMITSU CO., LTD. based on JIS B0601; 2001, which is the JIS standard for surface roughness. Before the collision step, Ra was 0.6830 μm, and Rz was 4.3964 μm. After the collision step, Ra was 0.5767 μm, and Rz was 4.3045 μm. In this manner, it was confirmed that the surface roughness of the workpiece was reduced in the collision step.

What is claimed is:

1. A surface treatment method comprising:
    a step of irradiating a workpiece with a pulsed laser beam through a transparent liquid; and
    a step of causing particles each having a core made of an elastic body and abrasive grains provided on a surface of the core to collide with a heat-affected layer developed on a surface layer portion of the workpiece in the step of irradiation, wherein
    the step of causing collision includes:
    causing the particles to collide with a surface of the workpiece from an oblique direction to grow a microcrack in a direction along the surface of the workpiece; and
    causing the particles to collide with the microcrack of the heat-affected layer to remove the heat-affected layer using the microcrack as a starting point.

2. The surface treatment method according to claim 1, wherein
    the step of causing collision includes repeatedly causing the particles to collide with the microcrack to gradually remove the heat-affected layer while the microcrack is connected to other cracks.

3. The surface treatment method according to claim 1, wherein
    the step of irradiation includes generating a pinhole on a surface of the heat-affected layer due to an inclusion contained in the workpiece, and
    the step of causing collision includes causing the particles to collide with the pinhole to remove the heat-affected layer using the pinhole as a starting point.

4. The surface treatment method according to claim 3, wherein
    the step of causing collision includes causing the particles to collide with a surface of the workpiece from an oblique direction to scrape off a surface layer of the heat-affected layer while the particles are caught inside the pinhole.

5. The surface treatment method according to claim 4, wherein
    the step of causing collision includes repeatedly causing the particles to collide with the pinhole to gradually remove the heat-affected layer.

6. The surface treatment method according to claim 1, wherein
    the step of causing collision includes removing the heat-affected layer by a thickness of 1 μm or more and 10 μm or less.

7. The surface treatment method according to claim 2, wherein
    the step of causing collision includes removing the heat-affected layer by a thickness of 1 μm or more and 10 μm or less.

8. The surface treatment method according to claim 3, wherein
    the step of causing collision includes removing the heat-affected layer by a thickness of 1 μm or more and 10 μm or less.

9. The surface treatment method according to claim 4, wherein
    the step of causing collision includes removing the heat-affected layer by a thickness of 1 μm or more and 10 μm or less.

10. The surface treatment method according to claim 5, wherein
    the step of causing collision includes removing the heat-affected layer by a thickness of 1 μm or more and 10 μm or less.

11. The surface treatment method according to claim 1, wherein
    the step of causing collision includes adjusting a surface roughness Ra of the workpiece to a range of 1.5 μm or less.

12. The surface treatment method according to claim 2, wherein
    the step of causing collision includes adjusting a surface roughness Ra of the workpiece to a range of 1.5 μm or less.

13. The surface treatment method according to claim 3, wherein
    the step of causing collision includes adjusting a surface roughness Ra of the workpiece to a range of 1.5 μm or less.

14. The surface treatment method according to claim 1, wherein
    the step of causing collision includes adjusting a surface roughness Ra of the workpiece to a range of 1.0 μm or less.

* * * * *